US008487636B2

(12) United States Patent
Mitsutani et al.

(10) Patent No.: US 8,487,636 B2
(45) Date of Patent: Jul. 16, 2013

(54) MALFUNCTION DETERMINING APPARATUS AND MALFUNCTION DETERMINING METHOD FOR CHARGING SYSTEM

(75) Inventors: Noritake Mitsutani, Toyota (JP); Yoshinori Fujitake, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 816 days.

(21) Appl. No.: 12/674,588

(22) PCT Filed: Sep. 2, 2008

(86) PCT No.: PCT/JP2008/065759
§ 371 (c)(1),
(2), (4) Date: Feb. 22, 2010

(87) PCT Pub. No.: WO2009/034883
PCT Pub. Date: Mar. 19, 2009

(65) Prior Publication Data
US 2010/0289516 A1 Nov. 18, 2010

(30) Foreign Application Priority Data

Sep. 10, 2007 (JP) ................................. 2007-234419

(51) Int. Cl.
*G01R 31/04* (2006.01)
(52) U.S. Cl.
USPC ........... 324/538; 324/555; 324/522; 320/104; 320/109; 320/164
(58) Field of Classification Search
USPC ....................................................... 324/508
See application file for complete search history.

(56) References Cited

U.S. PATENT DOCUMENTS

| 3,728,616 | A | * | 4/1973 | Cheek et al. ................... 324/538 |
| 5,341,083 | A | * | 8/1994 | Klontz et al. .................. 320/109 |
| 5,349,535 | A | * | 9/1994 | Gupta ............................. 702/63 |
| 5,369,352 | A |   | 11/1994 | Toepfer et al. |
| 5,548,200 | A | * | 8/1996 | Nor et al. ....................... 320/109 |
| 5,596,258 | A | * | 1/1997 | Kimura et al. ................ 320/163 |
| 5,684,379 | A | * | 11/1997 | Svedoff ........................ 320/125 |
| 2007/0046268 | A1 |   | 3/2007 | Irie |

FOREIGN PATENT DOCUMENTS

| EP | 0 622 265 A2 | 11/1994 |
| JP | A-06-343205 | 12/1994 |
| JP | A-07-007860 | 1/1995 |
| JP | A-07-123519 | 5/1995 |

(Continued)

OTHER PUBLICATIONS

"Electric Vehicle Conductive Charging System General Requirements," *Japan Electric Vehicle Association Standard*, Mar. 21, 2001 (With Translation).

(Continued)

*Primary Examiner* — Richard Isla Rodas
(74) *Attorney, Agent, or Firm* — Oliff & Berridge, PLC

(57) ABSTRACT

An ECU executes a program including a step of determining that a pilot wire for transferring a pilot signal CPLT, which is output when a charging cable is connected to a plug-in hybrid vehicle and an external power source, to the ECU is broken, when output of the pilot signal CPLT is currently stopped and a voltage VAC of the external power source (absolute value of voltage VAC) detected by a voltmeter provided within the plug-in hybrid vehicle is greater than zero.

21 Claims, 13 Drawing Sheets

FOREIGN PATENT DOCUMENTS

| | | |
|---|---|---|
| JP | A-08-126121 | 5/1996 |
| JP | A-10-304582 | 11/1998 |
| JP | A-11-205909 | 7/1999 |

OTHER PUBLICATIONS

"SAE Electric Vehicle Conductive Charge Coupler," *SAE Standards*, SAE International, Nov. 2001.

International Search Report issued in International Application No. PCT/JP2008/065759; Mailed on Dec. 2, 2008.

Feb. 6, 2012 Search Report issued in European Application No. 08831239.2.

Dec. 2, 2008 Written Opinion issued in PCT/JP2008/065759 (with translation).

Nov. 17, 2009 International Preliminary Report on Patentability issued in PCT/JP2008/065759 (with translation).

Aug. 25, 2009 Written Opinion issued in PCT/JP2008/065759 (with translation).

\* cited by examiner

F I G. 1
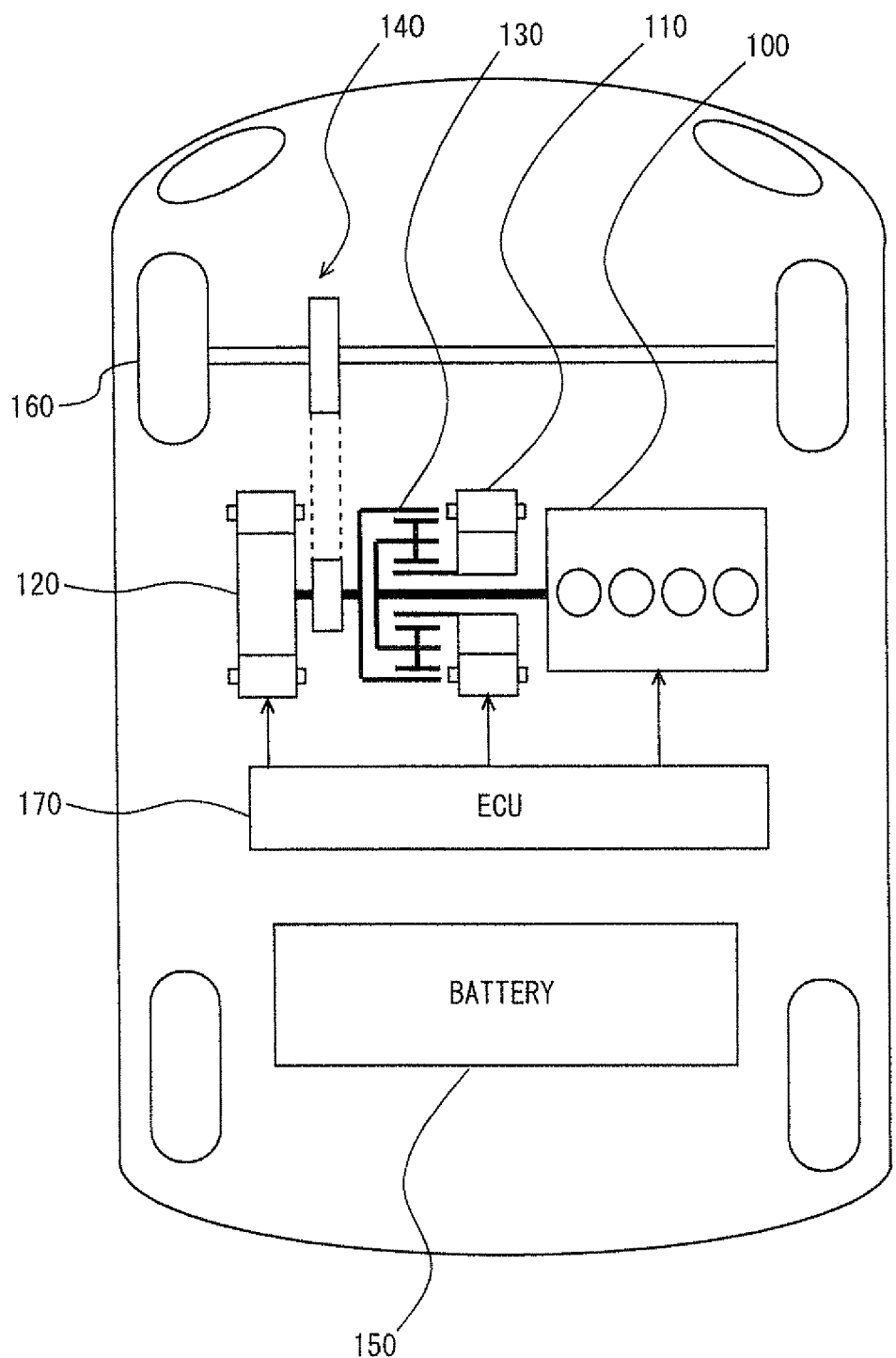

F I G. 6
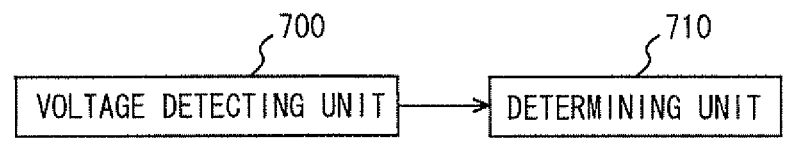

F I G. 9
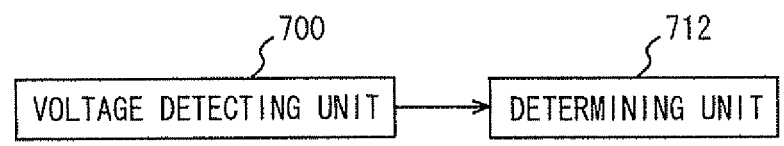

MALFUNCTION DETERMINING APPARATUS AND MALFUNCTION DETERMINING METHOD FOR CHARGING SYSTEM

TECHNICAL FIELD

The present invention relates to a malfunction determining apparatus and a malfunction determining method for a charging system, in particular, to a technique for determining a malfunction of a charging system that charges a battery mounted on a vehicle by electric power supplied from a power source external to the vehicle.

BACKGROUND ART

Conventionally, vehicles employing electric motors for their driving sources are known, such as hybrid vehicles, electric vehicles, and fuel cell vehicles. Each of such vehicles is provided with a power storage device such as a battery storing electric power to be supplied to the electric motor. The battery stores electric power generated upon regenerative braking, or electric power generated by a power generator mounted on the vehicle.

Meanwhile, in some vehicles, batteries mounted thereon are supplied and charged with electric power from power sources external to the vehicles, such as power sources of houses. By connecting an outlet provided in a house to a connector (inlet) provided in such a vehicle via a cable, electric power is supplied from the power source of the house to the battery of the vehicle. In the description below, a vehicle with a battery charged by a power source provided external to the vehicle is also referred to as "plug-in vehicle".

A standard of plug-in vehicles is established by "Electric Vehicle Conductive Charging System General Requirements" (non-patent document 1) in Japan, whereas it is established by "SAE Electric Vehicle Conductive Charge Coupler" (non-patent document 2) in the United States.

As one example, each of "Electric Vehicle Conductive Charging System General Requirements" and "SAE Electric Vehicle Conductive Charge Coupler" establishes a standard regarding a control pilot. A control pilot has a function of notifying a vehicle that an EVSE (Electric Vehicle Supply Equipment) is in a condition to supply energy (electric power), by sending a square wave signal (hereinafter, also referred to as "pilot signal") from an oscillator to a control pilot wire. An EVSE is equipment for coupling an external power source and a vehicle to each other. For example, when the plug of the EVSE is connected to the power source external to the vehicle and the connector of the EVSE is connected to a connector provided in the vehicle, a pilot signal is output. By means of a pulse width of the pilot signal, the plug-in vehicle is notified of a capacity of current that can be supplied. When detecting the pilot signal, the plug-in vehicle makes preparations to start charging (closes a relay and the like).

Non-Patent Document 1: "Electric Vehicle Conductive Charging System General Requirements", Japan Electric Vehicle Association Standards (Japan Electric Vehicle Standards), Mar. 29, 2001

Non-Patent Document 2: "SAE Electric Vehicle Conductive Charge Coupler", (the United States), SAE Standards, SAE International, November, 2001

DISCLOSURE OF THE INVENTION

Problems to be Solved by the Invention

When the oscillator for outputting the pilot signal malfunctions or a harness for transferring the pilot signal is broken, the pilot signal is not detected. Hence, it is considered that some malfunction has occurred when supply of the pilot signal is stopped. However, supply of the pilot signal is also stopped even when no malfunction occurs, i.e., when the plug of equipment (such as EVSE) for coupling the external power source and the vehicle to each other is detached from an outlet provided in a house, or in the event of power failure. Thus, it is difficult to determine from the pilot signal whether or not a malfunction exists.

However, at the moment of filing of the present application, neither "Electric Vehicle Conductive Charging System General Requirements" nor "SAE Electric Vehicle Conductive Charge Coupler" has established a specific standard as to how to determine whether or not a malfunction exists.

An object of the present invention is to provide a malfunction determining apparatus and a malfunction determining method for a charging system, by each of which it can be determined whether or not a malfunction exists.

Means for Solving the Problems

A malfunction determining apparatus according to a certain aspect is a malfunction determining apparatus for a charging system that charges a battery mounted on a vehicle by electric power supplied from a power source external to the vehicle to the battery via an EVSE when the vehicle and the power source are coupled to each other by the EVSE, the EVSE outputting a pilot signal when connected to the vehicle and the power source. The malfunction determining apparatus includes a voltage sensor that detects a voltage of the power source within the vehicle; and a control unit. The control unit determines whether or not a malfunction exists, in accordance with an output state of the pilot signal and the voltage detected.

According to this configuration, when the vehicle and the power source external to the vehicle are coupled by the EVSE, the battery mounted on the vehicle is supplied with electric power from the power source via the EVSE. The EVSE outputs the pilot signal when connected to the vehicle and the power source. The voltage of the power source is detected by the voltage sensor within the vehicle. If the EVSE is normal, the output state of the pilot signal from the EVSE and the behavior of the voltage detected are synchronized with each other. In other words, if the pilot signal is output from the EVSE, the voltage detected is greater than zero since the vehicle and the power source are connected to each other by the EVSE. If no pilot signal is output from the EVSE, the vehicle and the power source are disconnected from each other, so the voltage detected is zero. Meanwhile, if the output state of the pilot signal from the EVSE and the behavior of the voltage detected are deviated from each other, it can be determined that a malfunction exists. Thus, in accordance with the output state of the pilot signal from the EVSE and the voltage detected, it is determined whether or not a malfunction exists. For example, if no pilot signal is being output and the voltage detected is larger than the threshold value, or if the pilot signal is being output and the voltage detected is smaller than the threshold value, it is determined that a malfunction exists. In this way, whether or not a malfunction exists can be determined.

Preferably, when a predetermined condition is satisfied, the control unit determines whether or not a malfunction exists, in accordance with the output state of the pilot signal and the voltage detected.

According to this configuration, when the predetermined condition is satisfied, whether or not a malfunction exists can be determined in accordance with the output state of the pilot signal and the voltage detected. For example, the determination as to existence/non-existence of a malfunction is made when at least one of the following conditions is satisfied: a condition in which supply of electric power between the battery and the voltage sensor is stopped, a condition in which the EVSE is connected to the vehicle, and a condition in which a charge on a capacitor provided between the battery and the voltage sensor is zero. In this way, the voltage of the battery or a capacitor can be prevented from being detected erroneously as the voltage of the power source. Further, it can be adapted not to determine whether or not a malfunction exists, when the EVSE is not connected to the vehicle, i.e., when the voltage of the external power source cannot be detected inevitably within the vehicle. In this way, an erroneous determination as to whether or not a malfunction exists can be prevented.

More preferably, the condition is at least one of a condition in which supply of electric power between the battery and the voltage sensor is stopped, a condition in which the EVSE is connected to the vehicle, and a condition in which a charge on a capacitor provided between the battery and the voltage sensor is zero.

According to this configuration, whether or not a malfunction exists is determined when at least one of the conditions is satisfied, i.e., the condition in which supply of electric power between the battery and the voltage sensor is stopped, the condition in which the EVSE is connected to the vehicle, and the condition in which a charge on a capacitor provided between the battery and the voltage sensor is zero. In this way, the voltage of the battery or the capacitor can be prevented from being erroneously detected as the voltage of the power source. Further, it can be adapted not to determine whether or not a malfunction exists, when no EVSE is connected to the vehicle, i.e., when the voltage of the external power source cannot be detected inevitably within the vehicle. In this way, an erroneous determination as to whether or not a malfunction exists can be prevented.

More preferably, the control unit determines that a malfunction exists in the EVSE if the pilot signal is not being output and the voltage detected is larger than a threshold value.

According to this configuration, if a malfunction exists in the EVSE, the output state of the pilot signal from the EVSE and the behavior of the voltage detected are deviated from each other. Hence, if no pilot signal is being output and the voltage detected is greater than the threshold value, it is determined that there is a malfunction in the EVSE. In this way, a malfunction in the EVSE can be detected.

More preferably, the EVSE is provided with a relay that opens/closes a path for supplying electric power from the power source to the vehicle. The charging system outputs a command for operating the relay. If the pilot signal is being output and the voltage detected is smaller than a threshold value, the control unit determines that a malfunction exists in the EVSE at any of the path for supplying electric power from the power source to the vehicle, the relay, and a path for transferring the command.

According to this configuration, the EVSE is provided with the relay that opens/closes the path for supplying electric power from the power source to the vehicle. If a malfunction exists in the EVSE, the output state of the pilot signal from the EVSE and the behavior of the voltage detected are deviated from each other. Hence, if the pilot signal is being output and the voltage detected is smaller than the threshold value, it is determined that a malfunction exists in the EVSE at any of the path for supplying electric power from the power source to the vehicle, the relay, and the path for transferring the command. In this way, a malfunction in the EVSE can be detected.

More preferably, the EVSE is provided with a relay that opens/closes a path for supplying electric power from the power source to the vehicle. The charging system outputs a command for operating the relay. If the pilot signal is being output and the voltage detected is zero, the control unit determines that a malfunction exists in the EVSE at any of the path for supplying electric power from the power source to the vehicle, the relay, and a path for transferring the command.

According to this configuration, the EVSE is provided with the relay that opens/closes the path for supplying electric power from the power source to the vehicle. If a malfunction exists in the EVSE, the output state of the pilot signal from the EVSE and the behavior of the voltage detected are deviated from each other. Hence, if the pilot signal is being output and the voltage detected is zero, it is determined that a malfunction exists in the EVSE at any of the path for supplying electric power from the power source to the vehicle, the relay, and the path for transferring the command. In this way, a malfunction in the EVSE can be detected.

More preferably, the vehicle has a charger mounted thereon to control electric power charged to the battery.

According to this configuration, the charger mounted on the vehicle can be used to charge the battery.

EFFECTS OF THE INVENTION

According to the present invention, it can be determined whether or not a malfunction exists, in accordance with the output state of the pilot signal from the EVSE and the voltage of the power source external to the vehicle.

BRIEF DESCRIPTION OF THE DRAWINGS

FIG. 1 is a schematic diagram showing a plug-in hybrid vehicle.

FIG. 6 is a first function block diagram of an ECU.

FIG. 9 is a second function block diagram of the ECU.

DESCRIPTION OF THE REFERENCE SIGNS

Figure 2:
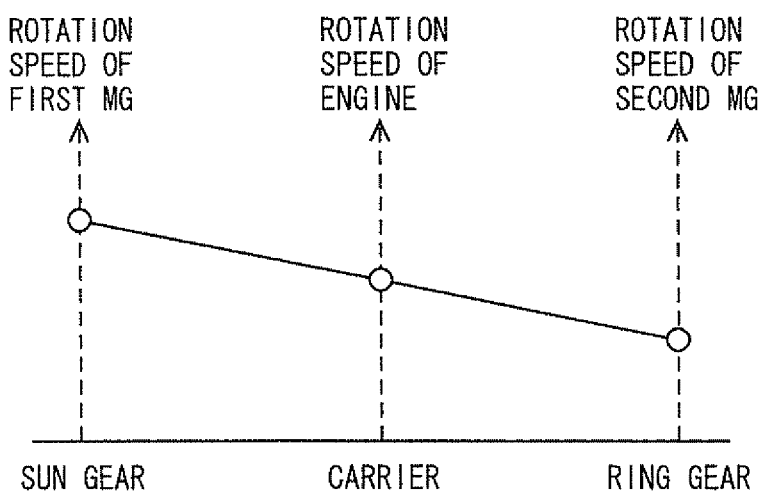
FIG. 2 shows a nomographic chart of a power split device.

100: engine; 110: first MG; 120: second MG; 130: power split device; 140: speed reducer; 150: battery; 160: front wheel; 170: ECU; 172: voltmeter; 200: converter; 210: first inverter; 220: second inverter; 230: DC/DC converter; 240: auxiliary battery; 242: auxiliary device; 270: connector; 280: LC filter; 282: capacitor; 290: charger; 292: AC/DC converting circuit; 294: DC/AC converting circuit; 296: isolation transformer; 298: rectifying circuit; 300: charging cable; 310: connector; 312: switch; 320: plug; 330: CCID; 332: relay; 334: control pilot circuit; 336: pilot wire; 340, 350: path; 400: outlet; 402: power source; 700: voltage detecting unit; 710, 712: determining unit.

BEST MODES FOR CARRYING OUT THE INVENTION

Referring to figures, embodiments of the present invention will be described below. In the description below, the same components are given the same reference characters. Their names and functions are also the same. Hence, they will not be described in detail repeatedly.

First Embodiment

Referring to FIG. 1, a plug-in hybrid vehicle having a malfunction determining apparatus according to a first embodiment of the present invention will be described. The vehicle includes an engine 100, a first MG (Motor Generator) 110, a second MG 120, a power split device 130, a speed reducer 140, and a battery 150.

The vehicle travels using driving power provided from at least one of engine 100 and second MG 120. Instead of the plug-in hybrid vehicle, an electric vehicle or a fuel cell vehicle traveling using only driving power supplied from a motor may be employed.

Engine 100, first MG 110, and second MG 120 are connected to one another via power split device 130. Motive power generated by engine 100 is split by power split device 130 for two paths. One of them is a path for driving front wheels 160 via speed reducer 140. The other is a path for driving first MG 110 to generate electric power.

First MG 110 is a three-phase alternating current rotating machine including a U-phase coil, a V-phase coil, and a W-phase coil. First MG 110 generates electric power using the motive power generated by engine 100 and split by power split device 130. The electric power generated by first MG 110 is used depending on a traveling state of the vehicle and a state of SOC (State Of Charge) of battery 150. For example, during normal traveling, the electric power generated by first MG 110 is used directly as electric power for driving second MG 120. On the other hand, when the SOC of battery 150 is lower than a predetermined value, the electric power generated by first MG 110 is converted by a below-described inverter from alternating-current power to direct-current power. Thereafter, a below-described converter adjusts a voltage thereof and the electric power is stored in battery 150.

When first MG 110 serves as a power generator, first MG 110 generates a negative torque. The negative torque used herein refers to a torque serving as a load for engine 100. When first MG 110 is supplied with electric power to operate as a motor, first MG 110 generates a positive torque. The positive torque used herein refers to a torque not serving as a load for engine 100, i.e., a torque assisting rotation of engine 100. The same holds true for second MG 120.

Second MG 120 is a three-phase alternating current rotating machine including a U-phase coil, a V-phase coil, and a W-phase coil. Second MG 120 is driven using at least one of the electric power stored in battery 150 and the electric power generated by first MG 110.

The driving power generated by second MG 120 is transmitted to front wheels 160 via speed reducer 140. In this way, second MG 120 assists engine 100, and the vehicle travels using the driving power provided from second MG 120. Instead of or in addition to front wheels 160, rear wheels may be driven.

Upon regenerative braking of the plug-in hybrid vehicle, front wheels 160 drive second MG 120 through speed reducer 140 and second MG 120 serves as a power generator. In this way, second MG 120 operates as a regenerative brake to convert the braking energy to electric power. The electric power thus generated by second MG 120 is stored in battery 150.

Power split device 130 is constituted by a planetary gear including a sun gear, a pinion gear, a carrier, and a ring gear. The pinion gear engages with the sun gear and the ring gear. The carrier rotatably supports the pinion gear. The sun gear is coupled to the rotation shaft of first MG 110. The carrier is coupled to the crankshaft of engine 100. The ring gear is coupled to the rotation shaft of second MG 120 and speed reducer 140.

Since engine 100, first MG 110, and second MG 120 are coupled to one another through power split device 130 constituted by the planetary gear, the rotation speeds of engine 100, first MG 110, and second MG 120 are in such a relation that they are connected by a straight line in a nomographic chart as shown in FIG. 2.

Referring to FIG. 1 again, battery 150 is a battery pack constituted by a plurality of battery modules connected in series and each having a plurality of battery cells incorporated therein. Battery 150 has a voltage of, for example, approximately 200 V. Battery 150 is charged by electric powers supplied from first MG 110 and second MG 120 as well as electric power supplied from a power source external to the vehicle.

Engine 100, first MG 110, and second MG 120 are controlled by an ECU (Electronic Control Unit) 170. ECU 170 may be divided into a plurality of ECUs.

Figure 3:
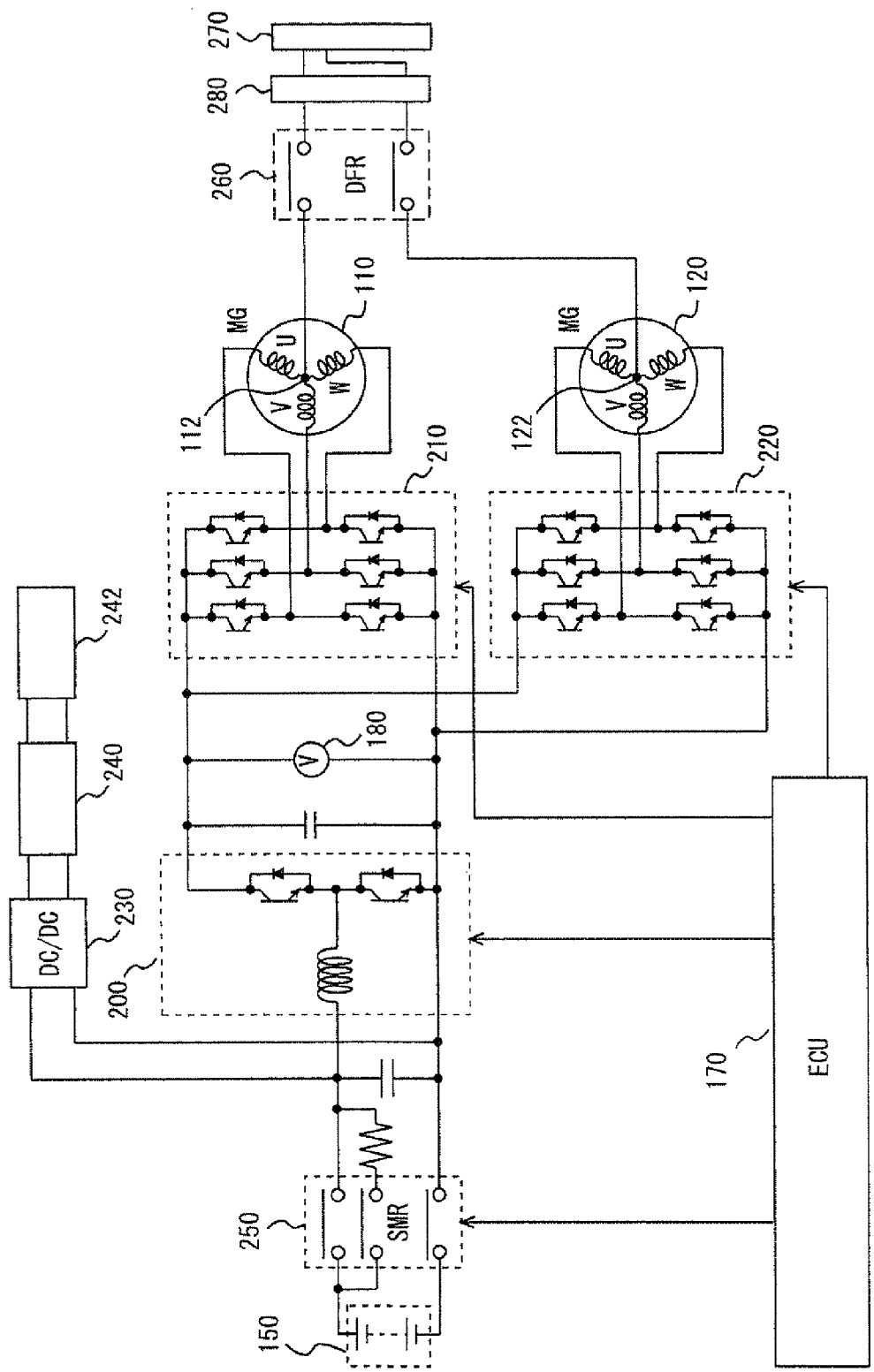
FIG. 3 is a first diagram showing an electrical system of the plug-in hybrid vehicle.

Referring to FIG. 3, an electrical system of the plug-in hybrid vehicle will be further described. The plug-in hybrid vehicle is provided with a converter 200, a first, inverter 210, a second inverter 220, a DC/DC converter 230, an auxiliary battery 240, an SMR (System Main Relay) 250, a DFR (Dead Front Relay) 260, a connector (inlet) 270, and an LC filter 280.

Converter 200 includes a reactor, two npn type transistors, and two diodes. The reactor has one end connected to the positive electrode side of battery 150, and has the other end connected to the connection point of the two npn type transistors.

The two npn type transistors are connected in series. The npn type transistors are controlled by ECU 170. Between the collector and the emitter of each npn type transistor, each diode is connected to allow a current to flow from the emitter side to the collector side.

As the npn type transistor, for example, an IGBT (Insulated Gate Bipolar Transistor) can be used. Instead of the npn type transistor, a power switching element such as a power MOSFET (Metal Oxide Semiconductor Field-Effect Transistor) can be used.

When supplying first MG 110 or second MG 120 with electric power discharged from battery 150, converter 200 boosts the voltage thereof. In contrast, when charging battery 150 with electric power generated by first MG 110 or second MG 120, converter 200 steps down the voltage thereof.

A voltmeter 180 detects a system voltage VH among converter 200, first inverter 210, and second inverter 220. A result of detection by voltmeter 180 is sent to ECU 170.

First inverter 210 includes a U-phase arm, a V-phase arm, and a W-phase arm. The U-phase arm, the V-phase arm, and the W-phase arm are connected in parallel. Each of the U-phase arm, the V-phase arm, and the W-phase arm has two npn type transistors connected in series. Between the collector and the emitter of each npn type transistor, each diode is connected to allow a current to flow from the emitter side to the collector side. The connection points of the npn type transistors of each arm are respectively connected to ends different from a neutral point 112 in each coil of first MG 110.

First inverter 210 converts a direct current supplied from battery 150 into an alternating current, and supplies it to first MG 110. Also, first inverter 210 converts an alternating current generated by first MG 110 into a direct current.

Second inverter 220 includes a U-phase arm, a V-phase arm, and a W-phase arm. The U-phase arm, the V-phase arm, and the W-phase arm are connected in parallel. Each of the U-phase arm, the V-phase arm, and the W-phase arm has two npn type transistors connected in series. Between the collector and the emitter of each npn type transistor, a diode is connected to allow a current to flow from the emitter side to the collector side. The connection points of the npn type transistors of each arm are respectively connected to ends different from a neutral point 122 in each coil of second MG 120.

Second inverter 220 converts a direct current supplied from battery 150 into an alternating current, and supplies it to second MG 120. Also, second inverter 220 converts an alternating current generated by second MG 120 into a direct current.

In each of the inverters, a set of the U-phase coil and the U-phase arm, a set of the V-phase coil and the V-phase arm, and a set of the W-phase coil and the W-phase arm each have a configuration similar to that of converter 200. Hence, first inverter 210 and second inverter 220 are capable of boosting a voltage. In the present embodiment, when charging battery 150 with electric power supplied from the power source external to the vehicle, first inverter 210 and second inverter 220 boost a voltage. For example, a voltage of 100 V is boosted to a voltage of approximately 200 V.

DC/DC converter 230 is connected between battery 150 and converter 200 in parallel with converter 200. DC/DC converter 230 steps down a direct-current voltage. DC/DC converter 230 outputs electric power, which is charged to auxiliary battery 240. The electric power thus charged to auxiliary battery 240 is supplied to an auxiliary device 242, such as an electrically driven oil pump, and ECU 170.

SMR (System Main Relay) 250 is provided between battery 150 and DC/DC converter 230. SMR 250 is a relay for switching between a state in which battery 150 and the electrical system are connected to each other and a state in which they are disconnected from each other. When SMR 250 is in the open state, battery 150 is disconnected from the electrical system. When SMR 250 is in the closed state, battery 150 is connected to the electrical system. The state of SMR 250 is controlled by ECU 170. For example, when ECU 170 becomes active, SMR 250 is closed. When ECU 170 becomes inactive, SMR 250 is opened.

DFR (Dead Front Relay) 260 is connected to neutral point 112 of first MG 110 and neutral point 122 of second MG 120. DFR 260 is a relay for switching between a state in which the electrical system of the plug-in hybrid vehicle and the external power source are connected to each other and a state in which they are disconnected from each other. When DFR 250 is in the open state, the electrical system of the plug-in hybrid vehicle is disconnected from the external power source. When DFR 250 is in the closed state, the electrical system of the plug-in hybrid vehicle is connected to the external power source.

Figure 4:
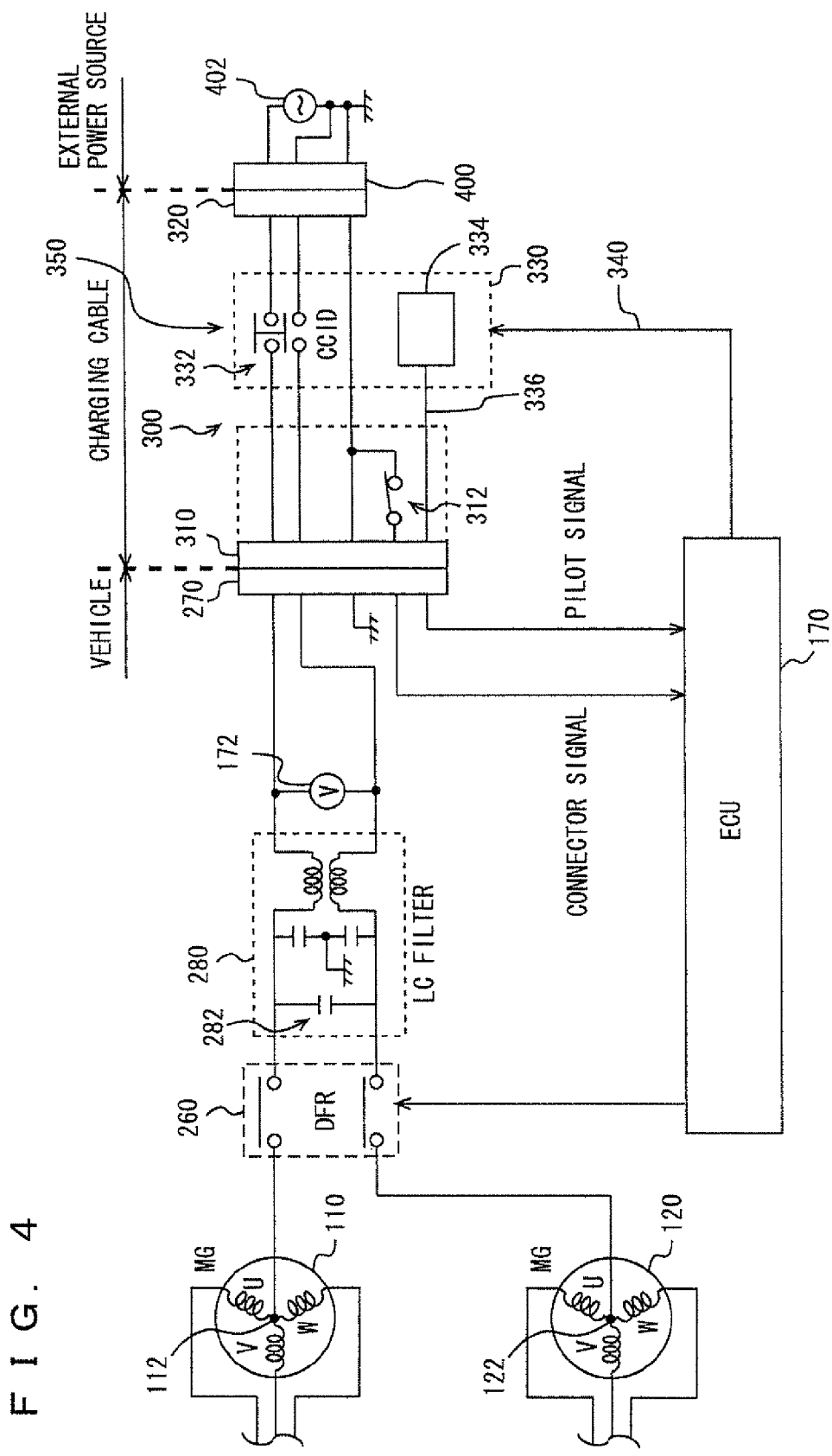
FIG. 4 is a second diagram showing the electrical system of the plug-in hybrid vehicle.

Connector 270 is provided at, for example, a side portion of the plug-in hybrid vehicle. As described below, to connector 270, a connector of a charging cable for coupling the plug-in hybrid vehicle to the external power source is connected. LC filter 280 is provided between DFR 260 and connector 270. As shown in FIG. 4, LC filter 280 is provided with a capacitor 282.

Charging cable 300 for coupling the plug-in hybrid vehicle to the external power source includes connector 310, a plug 320, and a CCID (Charging Circuit Interrupt Device) 330. Charging cable 300 corresponds to an EVSE.

Connector 310 of charging cable 300 is connected to connector 270 provided in the plug-in hybrid vehicle. Connector 310 is provided with a switch 312. When connector 310 of charging cable 300 is connected to connector 270 provided in the plug-in hybrid vehicle and switch 312 is closed, ECU 170 receives a connector signal CNCT indicating that connector 310 of charging cable 300 is connected to connector 270 provided in the plug-in hybrid vehicle.

Switch 312 is opened and closed in conjunction with a locking fitting (not shown) for locking connector 310 of charging cable 300 onto connector 270 of the plug-in hybrid vehicle. The locking fitting (not shown) swings when an operator presses a button (not shown) provided in connector 310.

For example, when connector 310 of charging cable 300 is connected to connector 270 provided in the plug-in hybrid vehicle and the operator takes a finger off the button, the locking fitting is engaged with connector 270 provided in the plug-in hybrid vehicle and switch 312 is closed. When the operator presses the button, the locking fitting and connector 270 are disengaged and switch 312 is opened. It should be noted that a way to open/close switch 312 is not limited to this.

Plug 320 of charging cable 300 is connected to an outlet 400 provided in a house. Outlet 400 is supplied with alternating-current power from power source 402 external to the plug-in hybrid vehicle.

CCID 330 has a relay 332 and a control pilot circuit 334. When relay 332 is in the open state, a path for supplying electric power from power source 402 external to the plug-in hybrid vehicle to the plug-in hybrid vehicle is disconnected. When relay 332 is closed, electric power can be supplied from power source 402 external to the plug-in hybrid vehicle to the plug-in hybrid vehicle. The state of relay 332 is controlled by ECU 170 when connector 310 of charging cable 300 is connected to connector 270 of the plug-in hybrid vehicle. A command from ECU 170 to CCID 330 is transferred via a path 340.

When plug 320 of charging cable 300 is connected to outlet 400, i.e., is connected to external power source 402 and connector 310 is connected to connector 270 provided in the plug-in hybrid vehicle, control pilot circuit 334 sends a pilot signal (square wave signal) CPLT to a control pilot wire. Pilot signal CPLT is transferred to ECU 170 via pilot wire 336.

The pilot signal is oscillated by an oscillator provided in control pilot circuit 334. Output of the pilot signal is delayed by an amount of delay in an operation of the oscillator or is stopped.

Even when plug 320 of charging cable 300 is connected to outlet 400 but connector 310 is detached from connector 270 provided in the plug-in hybrid vehicle, control pilot circuit 334 can output pilot signal CPLT constantly. However, ECU 170 cannot detect pilot signal CPLT output when connector 310 is detached from connector 270 provided in the plug-in hybrid vehicle.

When plug 320 of charging cable 300 is connected to outlet 400 and connector 310 is connected to connector 270 of the plug-in hybrid vehicle, control pilot circuit 334 oscillates pilot signal CPLT with a predetermined pulse width (duty cycle).

By means of the pulse width of pilot signal CPLT, the plug-in hybrid vehicle is notified of a capacity of current that can be supplied. For example, the plug-in hybrid vehicle is notified of a current capacity of charging cable 300. The pulse width of pilot signal CPLT is constant, not depending on voltage and current of external power source 402.

Meanwhile, when a different type of charging cable is used, the pulse width of pilot signal CPLT can differ. Specifically, the pulse width of pilot signal CPLT can be determined for each type of charging cable.

In the present embodiment, when the plug-in hybrid vehicle and external power source 402 are coupled to each other by charging cable 300, electric power supplied from external power source 402 is charged to battery 150. The electric power is supplied via a path 350 including relay 332.

Alternating-current voltage VAC of external power source 402 is detected by voltmeter 172 provided within the plug-in hybrid vehicle.

Figure 5:
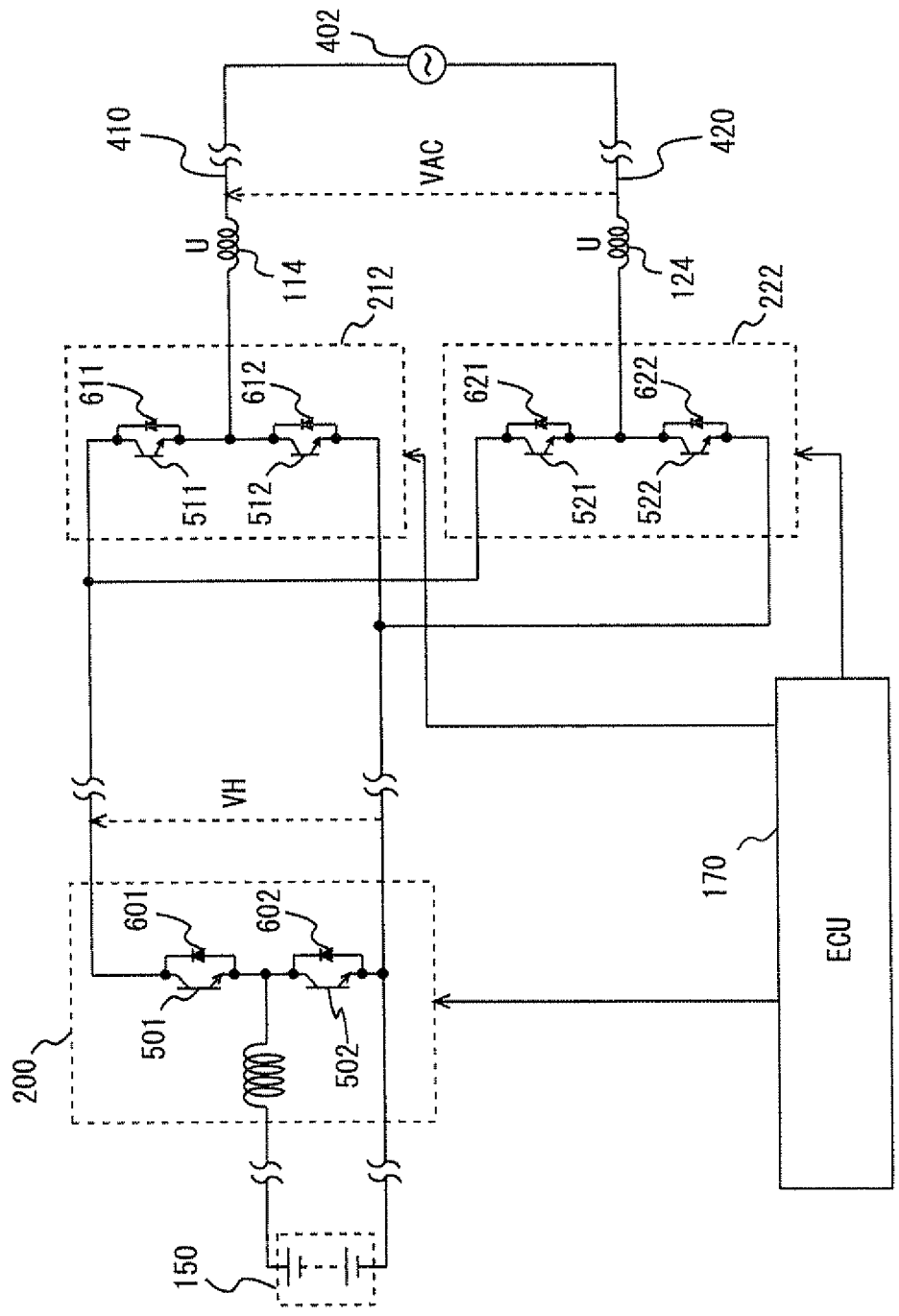
FIG. 5 is a third diagram showing the electrical system of the plug-in hybrid vehicle.

The following describes operations of converter 200, first inverter 210, and second inverter 220 when battery 150 is charged using external power source 402. FIG. 5 shows a portion of circuit diagrams shown in FIGS. 3 and 4, which is concerned with charging.

FIG. 5 representatively shows U-phase arms 212, 222 of first inverter 210 and second inverter 220 of FIG. 1. U-phase coils 114, 124 of the coils of first MG 110 and second MG 120 are representatively shown therein. The other two phase circuits operate in a manner similar to the U-phase circuit. Hence, detailed explanation therefor is not repeated here.

As described above, each of the set of U-phase coil 114 of first MG 110 and U-phase arm 212 of first inverter 210, and the set of U-phase coil 124 of second MG 120 and U-phase arm 222 of second inverter 220 has a configuration similar to that of converter 200.

When voltage VAC of external power source 402>0, i.e., a line 410 has a voltage VX higher than a voltage VY of a line 420, a transistor 501 of converter 200 is brought into the ON state and a transistor 502 thereof is brought into the OFF state. A transistor 512 of first inverter 210 is switched at a cycle and a duty ratio according to voltage VAC of external power source 402. A transistor 511 thereof is controlled to be in the OFF state or in a switching state in which it becomes conductive in synchronism with conduction of a diode 611. A transistor 521 of second inverter 220 is brought into the OFF state, and a transistor 522 thereof is brought into the ON state.

When transistor 512 of first inverter 210 is in the ON state, a current flows in U-phase coil 114, transistor 512, diode 622, and U-phase coil 124 in this order. Energy stored in U-phase coil 114 and U-phase coil 124 are released when transistor 512 of first inverter 210 is brought into the OFF state. The energy thus released, i.e., electric power, is supplied to battery 150 via diode 611 of first inverter 210 and transistor 501 of converter 200.

To reduce loss by diode 611 of first inverter 210, transistor 511 may be brought to be conductive in synchronism with a conduction period of diode 611. The switching cycle and duty ratio of transistor 512 of first inverter 210 are determined based on values of voltage VAC of the external power source and system voltage (voltage between converter 200 and each inverter) VH.

When voltage VAC of external power source 402<0, i.e., when voltage VX of line 410 is smaller than voltage VY of line 420, transistor 501 of converter 200 is brought into the ON state and transistor 502 thereof is brought into the OFF state. In second inverter 220, transistor 522 is switched at a cycle and a duty ratio according to voltage VAC, and transistor 521 is brought into the OFF state or a switching state in which it becomes conductive in synchronism with conduction of diode 621. Transistor 511 of first inverter 210 is brought into the OFF state and transistor 512 is brought into the ON state.

When transistor 522 of second inverter 220 is in the ON state, a current flows in U-phase coil 124, transistor 522, diode 612, and U-phase coil 114 in this order. Energy stored in U-phase coil 114 and U-phase coil 124 is released when transistor 522 of second inverter 220 is brought into the OFF state. The energy thus released, i.e., electric power is supplied to battery 150 via diode 621 of second inverter 220 and transistor 501 of converter 200.

To reduce loss by diode 621 of second inverter 220, transistor 521 may be brought to be conductive in synchronism with a conduction period of diode 621. The switching cycle and duty ratio of transistor 522 are determined based on voltage VAC of the external power source and system voltage VH.

Referring to FIG. 6, functions of ECU 170 will be described. It should be noted that the functions described below may be implemented by software or may be implemented by hardware.

ECU 170 includes a voltage detecting unit 700 and a determining unit 710. Voltage detecting unit 700 detects voltage VAC of external power source 402 based on a signal transmitted from voltmeter 172.

Determining unit 710 determines whether or not a malfunction exists in charging cable 300, in accordance with an output state of pilot signal CPLT and voltage VAC detected by voltage detecting unit 700. For example, determining unit 710 determines whether or not a malfunction exists, when conditions are satisfied in which supply of electric power between battery 150 and voltmeter 172 is stopped, charging cable 300 is connected to the plug-in hybrid vehicle, and a charge on capacitor 282 of LC filter 280 provided between battery 150 and voltmeter 172 is zero.

When DFR 260 is open or when operations (switching) of first inverter 210 and second inverter 220 are stopped (when the gates are OFF), it is determined that the supply of electric power between battery 150 and voltmeter 172 is stopped. In other words, when the path for supplying electric power is disconnected between battery 150 and voltmeter 172, it is determined that the supply of electric power between battery 150 and voltmeter 172 is stopped.

When connector signal CNCT is detected, it is determined that charging cable 300 is connected to the plug-in hybrid vehicle. When a predetermined period of time has passed since charging of battery 150 by external power source 402 was suspended, it is determined that charge on capacitor 282 of LC filter 280 is zero.

It should be noted that conditions for determining whether or not a malfunction exists are not limited to these. Existence/non-existence of a malfunction may be determined when at least one of the conditions is satisfied, i.e., the condition in which supply of electric power between battery 150 and voltmeter 172 is stopped, the condition in which charging cable 300 is connected to the plug-in hybrid vehicle, and the condition in which charge on capacitor 282 of LC filter 280 provided between battery 150 and voltmeter 172 is zero.

Determining unit 710 determines that a malfunction exists in charging cable 300, if pilot signal CPLT is not being output and voltage VAC of external power source 402 (absolute value of voltage VAC) is greater than zero. More specifically, it is determined that pilot wire 336 for transferring pilot signal CPLT to ECU 170 is broken.

Figure 7:
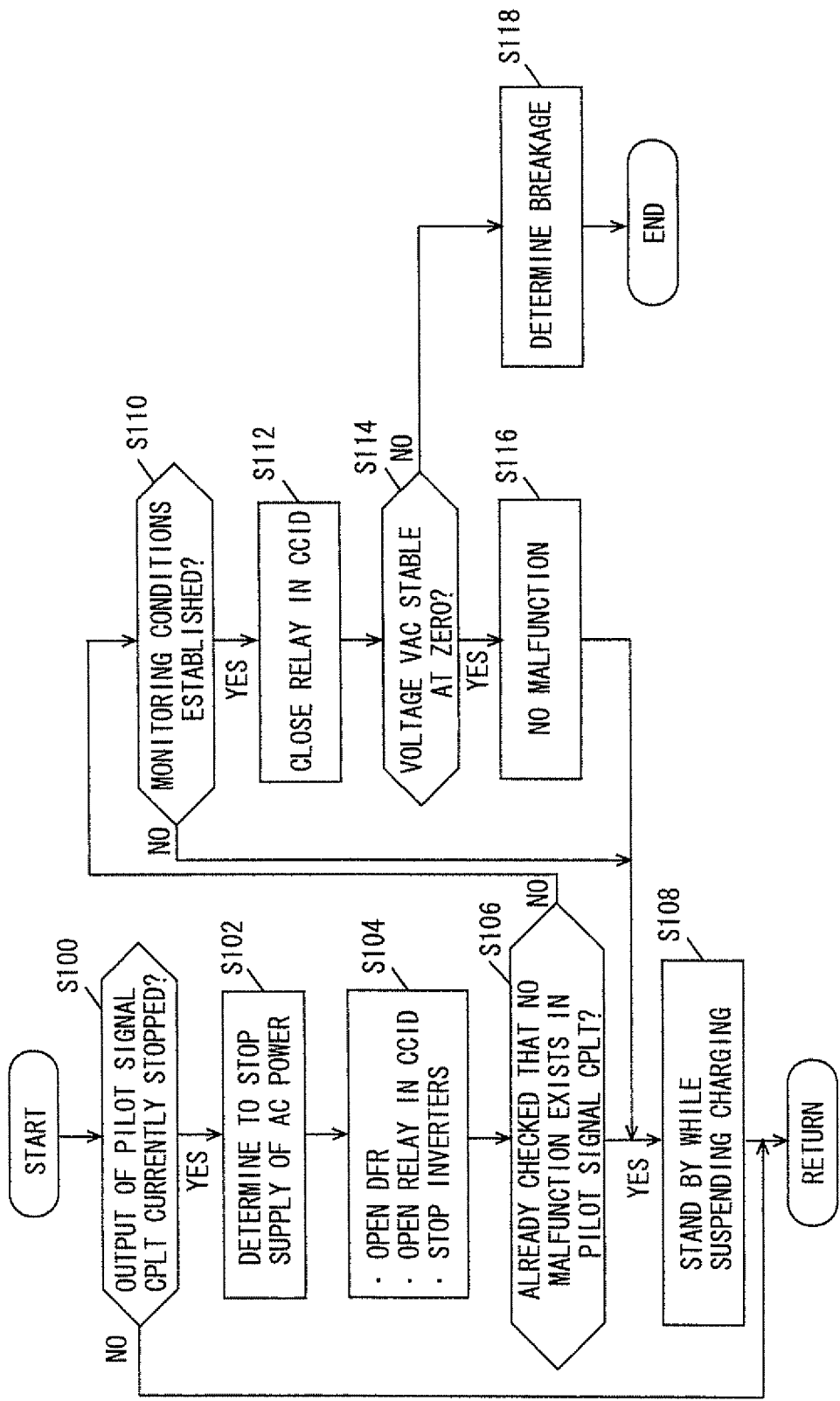
FIG. 7 is a first flowchart showing a control structure of a program executed by the ECU.

Referring to FIG. 7, a control structure of a program executed by ECU 170 will be described. It should be noted that the program executed by ECU 170 may be stored in a storage medium such as a CD (Compact Disc) or a DVD (Digital Versatile Disc) for distribution in a market.

In a step (hereinafter, the word "step" is abbreviated as "S") 100, ECU 170 determines whether or not output of pilot signal CPLT is currently stopped. In other words, ECU 170 determines whether pilot signal CPLT is not being output. If output of pilot signal CPLT is currently stopped (YES in S100), the process goes to an S102. Otherwise (NO in S100), the process goes back to S100. In S102, ECU 170 determines to stop supply of AC electric power. In other words, it determines to suspend charging of battery 150 and stand by while suspending the charging.

In an S104, ECU 170 opens DFR 260, opens relay 332 in CCID 330, and stops operations (switching) of first inverter 210 and second inverter 220.

In an S106, ECU 170 determines whether or not a malfunction of pilot signal CPLT has been already checked this time during the standby with the charging being suspended. If it has been already checked that no malfunction of pilot signal CPLT exists (YES in S106), the process goes to an S108. Otherwise (NO in S106), the process goes to an S110.

In S108, ECU 170 stands by while suspending the charging. In other words, the suspension of charging is continued. Thereafter, the process goes back to S100.

In S110, ECU 170 determines whether or not a monitoring condition for pilot signal CPLT and voltage VAC of external power source 402 have been established. The monitoring condition is, for example, a condition in which the path between battery 150 and voltmeter 172 for supplying electric power is disconnected, connector signal CNCT is detected, and a predetermined period of time has passed since the entry to standby with the charging being suspended. It should be noted that the monitoring condition is not limited to this. When the monitoring condition is established (YES in S110), the process goes to an S112. Otherwise (NO in S112), the process goes back to S108.

In S112, ECU 170 closes relay 332 in CCID 330 (brings into connection). In an S114, ECU 170 determines whether or not voltage VAC of external power source 402 is stable at zero. For example, when voltage VAC continues to be zero for a predetermined period of time or longer, it is determined that voltage VAC is stable at zero. If voltage VAC of external power source 402 is stable at zero (YES in S114), the process goes to an S116. Otherwise (NO in S114), the process goes to an S118.

In S116, ECU 170 determines that there is no malfunction. In S118, ECU 170 determines that pilot wire 336 for transferring pilot signal CPLT to ECU 170 is broken. Thereafter, this process ends.

The following describes operations performed by ECU 170 in the present embodiment based on the above-described structure and flowchart.

Figure 8:
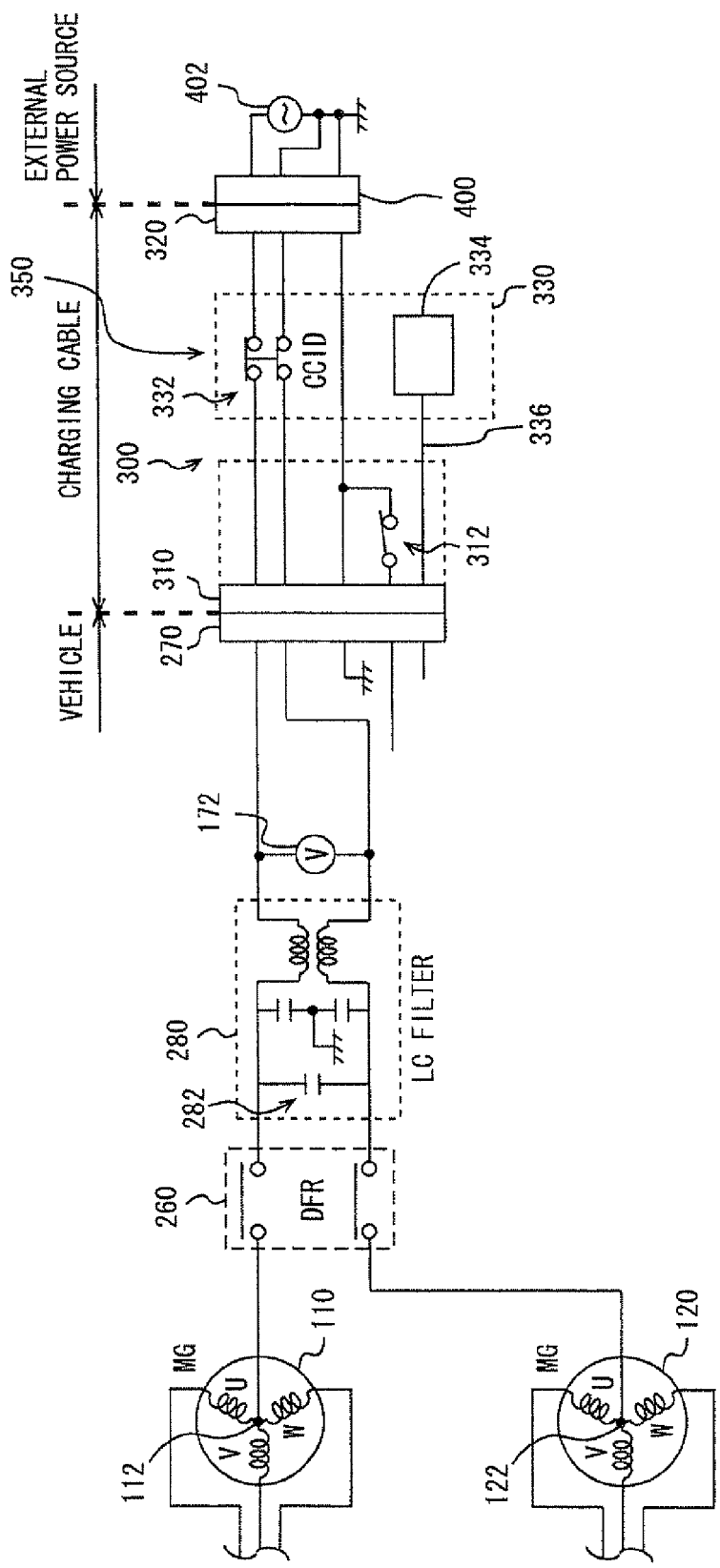
FIG. 8 is a fourth diagram showing the electrical system of the plug-in hybrid vehicle.

As shown in FIG. 8, when connector 310 of charging cable 300 is connected to connector 270 of the plug-in hybrid vehicle and plug 320 is connected to outlet 400, i.e., external power source 402, pilot signal CPLT is input to ECU 170.

Hence, if output of pilot signal CPLT is currently stopped (NO in S100), connector 310 of charging cable 300 is detached from connector 270 of the plug-in hybrid vehicle, plug 320 is detached from outlet 400, or power failure occurs. In any of these states, battery 150 cannot be charged by external power source 402.

Accordingly, it is determined to stop supply of AC electric power (S102). To stop the supply of AC electric power, DFR 260 is opened, relay 332 in CID 330 is opened, and the operations (switching) of first inverter 210 and second inverter 220 are stopped (S104).

If it has been checked already this time that there is no malfunction of pilot signal CPLT during standby with the charging being suspended (YES in S106), ECU 170 stands by while suspending the charging (S108).

Meanwhile, if it has not been checked yet that no malfunction of pilot signal CPLT exists (NO in S106), it is determined whether the monitoring condition for pilot signal CPLT and voltage VAC of power source 402 are satisfied (S110).

When the path between battery 150 and voltmeter 172 for supplying electric power is disconnected, the voltage of battery 150 has a small influence over a detection value of voltmeter 172. When connector signal CNCT is detected, power failure does not occur, and path 350 for supplying electric power is normal in charging cable 300, voltage VAC of power source 402 is accordingly detected by voltmeter 172.

When the predetermined period of time has passed since the entry to standby with the charging being suspended, charge on capacitor 282 of LC filter 280 can be zero. In this case, the voltage of capacitor 282 has a small influence over a detection value of voltmeter 172.

As such, voltmeter 172 can accurately detect voltage VAC of power source 402 when the monitoring condition is satisfied, i.e., the condition in which the path between battery 150 and voltmeter 172 for supplying electric power is disconnected, connector signal CNCT is detected, and the predetermined period of time has passed since the entry to standby with the charging being suspended.

Hence, when the monitoring condition is established (YES in S110), relay 332 opened in CCID 330 is closed to detect voltage VAC of power source 402 (S112).

If output of pilot signal CPLT is currently stopped, connector signal CNCT is detected, and charging cable 300 is normal, plug 320 is detached from outlet 400 or power failure has occurred. In either case, voltage VAC detected is zero. In other words, the output state of pilot signal CPLT and behavior of voltage VAC are synchronized with each other. Hence, if voltage VAC of external power source 402 is stable at zero (YES in S114), it is determined that there is no malfunction (S116).

Meanwhile, if voltage VAC is greater than zero (NO in S114), plug 320 of charging cable 300 is connected to outlet 400 and there is no power failure. This case can be said as a case where pilot signal CPLT should be detected but is not detected. Hence, it is detected that pilot wire 336 for transferring pilot signal CPLT to ECU 170 is broken (S116).

As described above, according to the malfunction determining apparatus in the present embodiment, if output of pilot signal CPLT is stopped and the external power source's voltage VAC detected within the plug-in hybrid vehicle is greater than zero, it is determined that the pilot wire for transferring pilot signal CPLT is broken in the charging cable. In this way, it can be determined whether or not a malfunction exists in the charging cable.

Second Embodiment

A second embodiment of the present invention will be described below. The present embodiment is different from the foregoing first embodiment in that it is determined that a malfunction concerning the charging cable exists if pilot signal CPLT is being output and voltage VAC of the external power source is zero. Apart from this, the structures in the plug-in hybrid vehicle are the same as those in the foregoing first embodiment. Their functions are also the same. Hence, detailed explanation therefor will not be given repeatedly.

Referring to FIG. 9, functions of ECU 170 in the present embodiment will be described. The functions described below may be implemented by software or may be implemented by hardware.

In the present embodiment, if pilot signal CPLT is being output and voltage VAC of external power source 402 (absolute value of voltage VAC) is zero, determining unit 712 determines that there is a malfunction concerning charging cable 300. More specifically, it is determined that there is a malfunction in charging cable 300 at any of path 350 for supplying electric power from power source 402 to the plug-in hybrid vehicle, relay 332, and path 340 for transferring a command to CCID 330. It should be noted that when voltage VAC (absolute value of voltage VAC) is smaller than a threshold value (for example, a positive threshold value), it may be determined that a malfunction concerning charging cable 300 exists.

Figure 10:
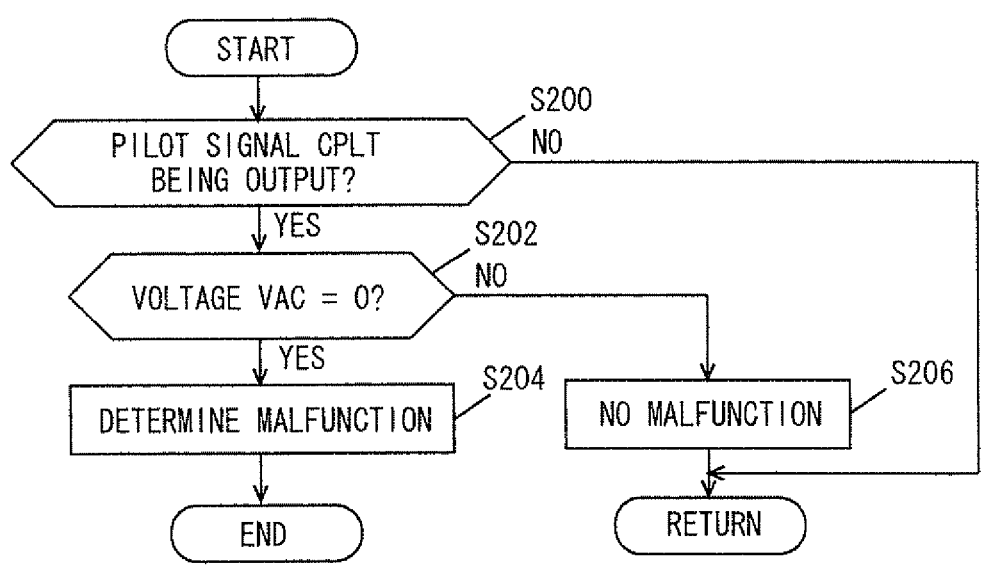
FIG. 10 is a second flowchart showing a control structure of a program executed by the ECU.

Referring to FIG. 10, a control structure of a program executed by ECU 170 in the present embodiment will be described. The program described below is executed while battery 150 is being charged, i.e., while relay 332 in CCID 330 is in the closed state.

In an S200, ECU 170 determines whether or not pilot signal CPLT is being output. If pilot signal CPLT is being output (YES in S200), the process goes to an S202. Otherwise (NO in S200), the process goes back to S200.

In an S202, ECU 170 determines whether or not voltage VAC of external power source 402 (absolute value of voltage VAC) is zero. If voltage VAC of external power source 402 is zero (YES in S202), the process goes to an S204. Otherwise (NO in S202), the process goes to an S206. Instead of determining whether or not voltage VAC of external power source 402 (absolute value of voltage VAC) is zero, it may be determined whether or not voltage VAC is smaller than a threshold value (for example, a positive threshold value).

In S204, ECU 170 determines that a malfunction concerning the charging cable exists. In an S206, ECU 170 determines that no malfunction exists.

The following describes operations performed by ECU 170 in the present embodiment based on the above-described structure and flowchart.

If pilot signal CPLT is being output (YES in S200), it can be said that connector 310 of charging cable 300 is connected to connector 270 of the plug-in hybrid vehicle, plug 320 is connected to outlet 400, i.e., external power source 402, and there is no power failure.

In this state, if charging cable 300 is normal, electric power is supplied from power source 402 to the plug-in hybrid vehicle. Accordingly, if voltage VAC of external power source 402 is not zero (NO in S202), i.e., if electric power is being supplied from external power source 402 to the plug-in hybrid vehicle, it is determined that no malfunction exists (S206).

Meanwhile, voltage VAC detected by voltmeter 172 is zero if path 350 for supplying electric power from power source 402 to the plug-in hybrid vehicle is broken in charging cable 300, if relay 332 is left open due to its breakage, or if relay 332 is left open due to disconnection of path 340 for transferring a command to CCID 330.

If voltage VAC of external power source 402 is zero (S202), it is determined that a malfunction concerning charging cable 300 exists (S204). In this way, a malfunction in charging cable 300 can be detected.

It should be noted that if pilot signal CPLT is not being output and voltage VAC detected by voltmeter 172 is zero, it may be determined that there is power failure. If it is determined that there is power failure, the charging may be suspended for a predetermined standby time. The charging may be resumed when pilot signal CPLT is output and voltage VAC (absolute value of voltage VAC) becomes greater than the threshold value during the suspension of charging.

If pilot signal CPLT is not being output and voltage VAC detected by voltmeter 172 continues to be zero for the standby time or longer after the charging was suspended, ignition switch may be turned of to stop the charging.

If the charging cannot be started due to power failure, i.e., if electric power is failed upon connecting plug 320 of charging cable 300 to outlet 400, the standby time may be set shorter than that when power failure occurs during charging.

Third Embodiment

A third embodiment of the present invention will be described below. The present embodiment is different from the foregoing first embodiment and second embodiment, in that a charger 290 is provided apart from converter 200, first inverter 210, and second inverter 220.

Figure 11:
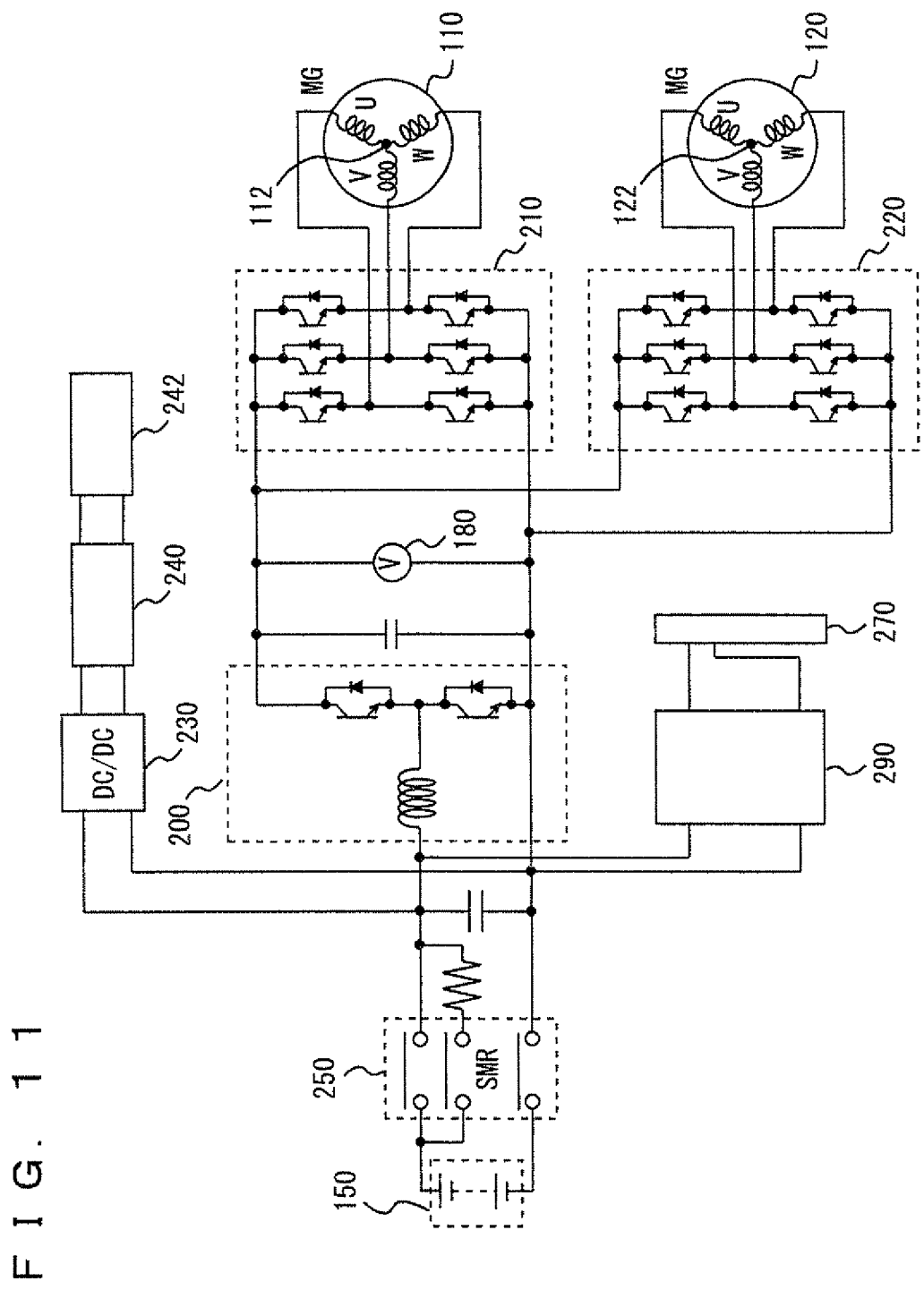
FIG. 11 is a fifth diagram showing the electrical system of the plug-in hybrid vehicle.
Figure 12:
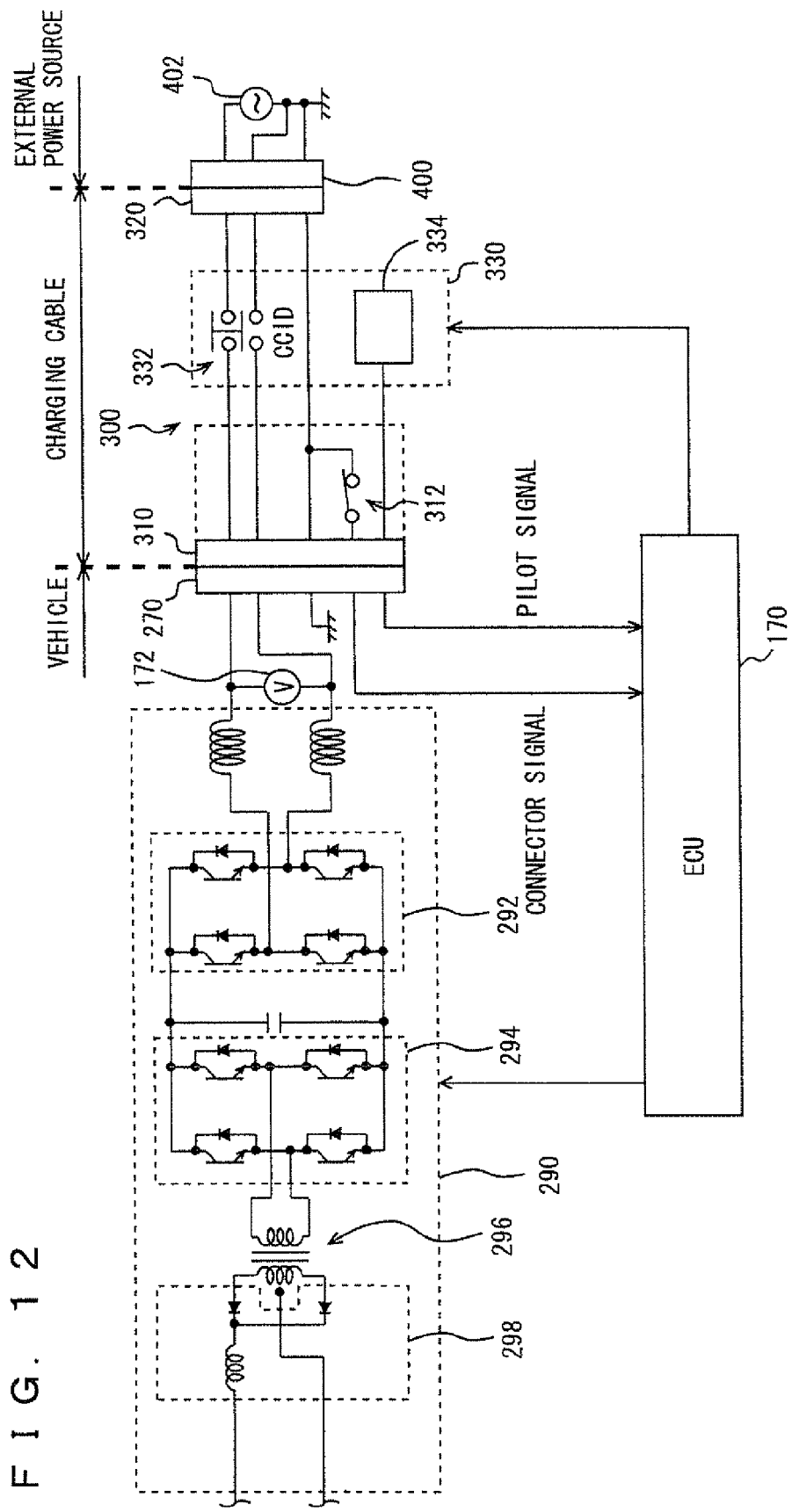
FIG. 12 is a sixth diagram showing the electrical system of the plug-in hybrid vehicle.

Referring to FIG. 11, in the electrical system of the plug-in hybrid vehicle, charger 290 is further provided to control electric power charged to battery 150. Using charger 290, battery 150 is charged. Charger 290 is connected between battery 150 and converter 200. As shown in FIG. 12, charger 290 includes an AC/DC converting circuit 292, a DC/AC converting circuit 294, an isolation transformer 296, and a rectifying circuit 298.

AC/DC converting circuit 292 is constituted by a single-phase bridge circuit. AC/DC converting circuit 292 converts alternating-current power to direct-current power based on a driving signal from ECU 170. Further, AC/DC converting circuit 292 employs a coil as a reactor to serve as a boost chopper circuit for boosting a voltage.

DC/AC converting circuit 294 is constituted by a single-phase bridge circuit. DC/AC converting circuit 294 converts the direct-current power to high frequency alternating-current power based on a driving signal from ECU 170, and outputs it to isolation transformer 296.

Isolation transformer 296 includes a core formed of a magnetic material, and primary and secondary coils each wound around the core. The primary coil and the secondary coil are electrically insulated from each other, and are respectively connected to DC/AC converting circuit 294 and rectifying circuit 298. Isolation transformer 296 converts the high frequency alternating-current power received from DC/AC converting circuit 294, into one with a voltage level corresponding to a ratio of the numbers of windings of the primary coil and the secondary coil, and then sends it to rectifying circuit 298. Rectifying circuit 298 receives the alternating-current power from isolation transformer 296 and rectifies it into direct-current power.

Reference Example

The following describes a case of suspending charging of battery 150.

Figure 13:
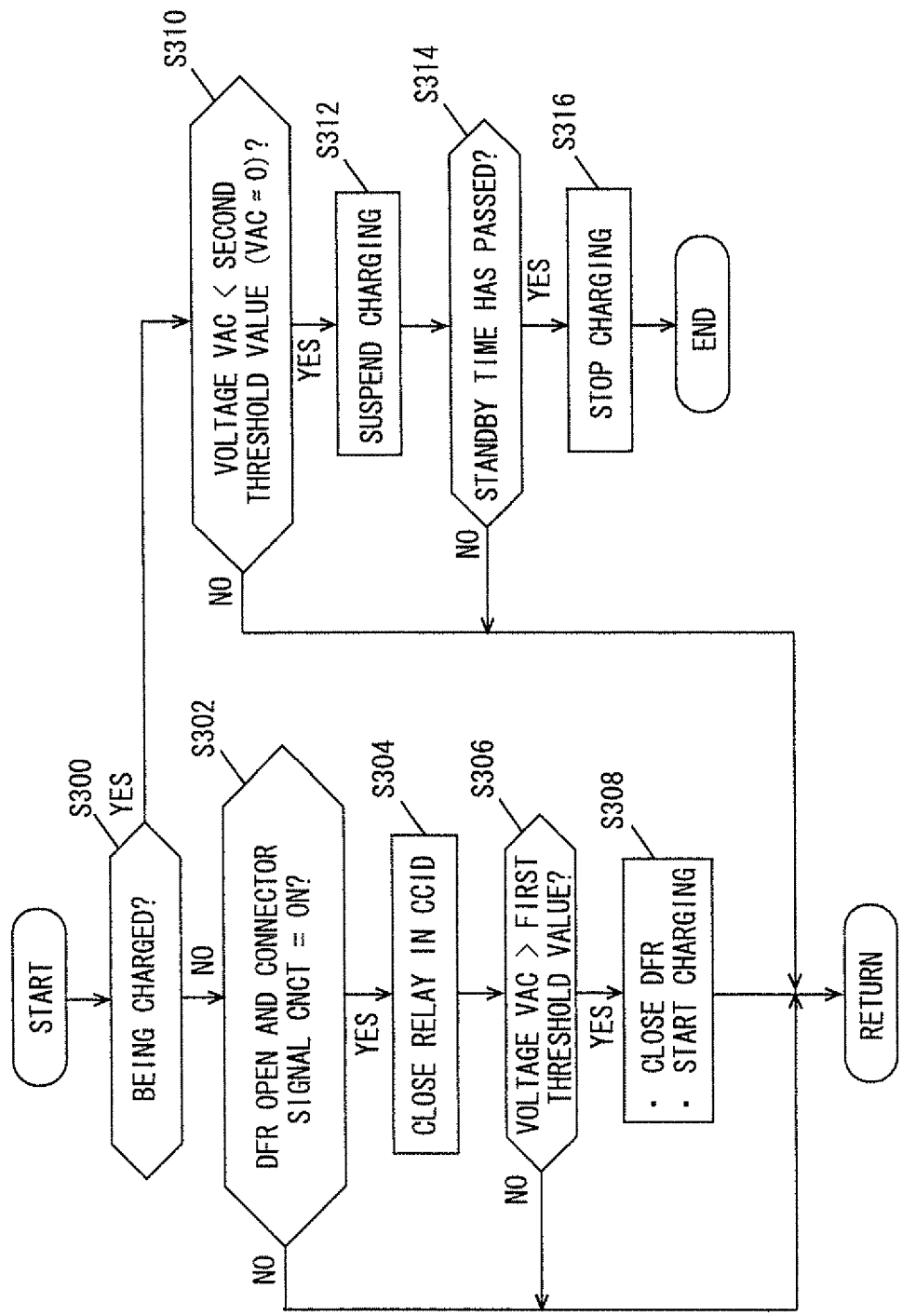
FIG. 13 is a third flowchart showing a control structure of a program executed by the ECU.

Referring to FIG. 13, a control structure of a program executed by ECU 170 will be described.

In an S300, ECU 170 determines whether or not battery 150 is being charged by power source 402 external to the plug-in hybrid vehicle. For example, when DFR 260 and relay 332 in CCID 330 are closed, it is determined that battery 150 is being charged. A way to determine whether or not battery 150 is being charged is not limited to this. When battery 150 is being charged (YES in S300), the process goes to an S310. Otherwise (NO in S300), the process goes to an S302.

In S302, ECU 700 determines whether or not DFR 260 is open and the connector signal is ON (being output). When DFR 260 is open and the connector signal is ON (YES in S302), the process goes to an S304. Otherwise (NO in S302), the process goes back to S300. In S304, ECU 170 closes relay 332 in CCID 330.

In an S306, ECU 170 determines whether or not voltage VAC of power source 402 is greater than a first threshold value. In other words, it is determined whether or not there is an input from voltmeter 172. When voltage VAC of power source 402 is greater than the threshold value (YES in S306), the process goes to S308. Otherwise (NO in S306), the process goes back to S300. In an S308, ECU 170 closes DFR 260 to start charging.

In S310, ECU 170 determines whether or not voltage VAC of external power source 402 is smaller than a second threshold value. In other words, it is determined whether or not voltage VAC is substantially zero. When voltage VAC of external power source 402 is smaller than the second threshold value (YES in S310), the process goes to S312. Otherwise (NO in S300), the process goes back to S300. In S312, ECU 170 suspends the charging. Instead of suspending the charging, the charging may be stopped immediately.

In an S314, ECU 170 determines whether or not a predetermined standby time has passed since the charging was suspended. When the standby time has passed since the charging was suspended (YES in S314), the process goes to an S316. Otherwise (NO in S314), the process goes back to S300. In S316, ECU 170 stops the charging. When the charging is stopped, DFR 260 or relay 332 of CCID 330 is opened if it is closed. Thereafter, the process ends.

The following describes operations performed by ECU 170 based on the above-described structure and flowchart. When battery 150 is being charged (YES in S300) and for example plug 320 of charging cable 300 is detached from outlet 400, voltage VAC detected by voltmeter 172 becomes smaller than the second threshold value (YES in S310). In other words, voltage VAC is substantially zero.

In this case, the charging is suspended (S312). When voltage VAC is smaller than the threshold value and the standby time has passed since the charging was suspended (YES in S314), the charging is stopped (S316).

Meanwhile, when battery 150 is not being charged (NO in S300), DFR 260 is opened, and the connector signal is on (YES in S302), relay 332 in CCID 330 is closed (S304). In this state, when voltage VAC of power source 402 is greater than the first threshold value (S306), DFR 260 is closed and charging is started (S308). In this way, the charging can be resumed when supply of electric power from power source 402 to the plug-in hybrid vehicle is resumed after suspending the charging and before the standby time has passed.

Although the embodiments of the present invention have been described, it should be considered that the embodiments disclosed herein are illustrative and non-restrictive in any respect. The scope of the present invention is defined by the scope of claims, and is intended to include any modifications within the scope and meaning equivalent to the terms of the claims.

The invention claimed is:

1. A malfunction determining apparatus for a charging system that charges a battery mounted on a vehicle by electric power supplied from a power source external to said vehicle to said battery via an Electric Vehicle Supply Equipment (EVSE) when said vehicle and said power source are coupled to each other by said EVSE, wherein said EVSE outputs a pilot signal, which indicates a capacity of current able to be supplied, when connected to said vehicle and said power source, the malfunction determining apparatus comprising:
    a voltage sensor that detects a voltage of said power source within said vehicle; and
    a control unit that determines whether or not a malfunction exists, in accordance with an output state of said pilot signal and the voltage detected, wherein
    said control unit determines that a malfunction exists in said EVSE if said pilot signal is not being output and the voltage detected is larger than a threshold value.

2. The malfunction determining apparatus for a charging system according to claim 1, wherein when a predetermined condition is satisfied, said control unit determines whether or not a malfunction exists, in accordance with the output state of said pilot signal and the voltage detected.

3. The malfunction determining apparatus for a charging system according to claim 2, wherein said condition is at least one of a condition in which supply of electric power between said battery and said voltage sensor is stopped, a condition in which said EVSE is connected to the vehicle, and a condition in which a charge on a capacitor provided between said battery and said voltage sensor is zero.

4. The malfunction determining apparatus for a charging system according to claim 1, wherein:
    said EVSE is provided with a relay that opens/closes a path for supplying electric power from said power source to said vehicle,
    said charging system outputs a command for operating said relay, and
    if said pilot signal is being output and the voltage detected is smaller than a threshold value, said control unit determines that a malfunction exists in said EVSE at any of the path for supplying electric power from said power source to said vehicle, said relay, and a path for transferring said command.

5. The malfunction determining apparatus for a charging system according to claim 1, wherein:
    said EVSE is provided with a relay that opens/closes a path for supplying electric power from said power source to said vehicle,
    said charging system outputs a command for operating said relay, and
    if said pilot signal is being output and the voltage detected is zero, said control unit determines that a malfunction exists in said EVSE at any of the path for supplying electric power from said power source to said vehicle, said relay, and a path for transferring said command.

6. The malfunction determining apparatus for a charging system according to claim 1, wherein said vehicle has a charger mounted thereon to control electric power charged to said battery.

7. A malfunction determining method for a charging system that charges a battery mounted on a vehicle by electric power supplied from a power source external to said vehicle to said battery via an Electric Vehicle Supply Equipment (EVSE) when said vehicle and said power source are coupled to each other by said EVSE, wherein said EVSE outputs a pilot signal, which indicates a capacity of current able to be supplied, when connected to said vehicle and said power source, the malfunction determining method comprising the steps of:

detecting a voltage of said power source using a voltage sensor provided within said vehicle; and determining whether or not a malfunction exists, in accordance with an output state of said pilot signal and the voltage detected, wherein the step of determining whether or not a malfunction exists includes a step of determining that a malfunction exists in said EVSE if said pilot signal is not being output and the voltage detected is larger than a threshold value.

8. The malfunction determining method for a charging system according to claim 7, wherein the step of determining whether or not a malfunction exists includes a step of determining whether or not a malfunction exists, when a predetermined condition is satisfied, in accordance with the output state of said pilot signal and the voltage detected.

9. The malfunction determining method for a charging system according to claim 8, wherein said condition is at least one of a condition in which supply of electric power between said battery and said voltage sensor is stopped, a condition in which said EVSE is connected to the vehicle, and a condition in which a charge on a capacitor provided between said battery and said voltage sensor is zero.

10. The malfunction determining method for a charging system according to claim 7, wherein:

said EVSE is provided with a relay that opens/closes a path for supplying electric power from said power source to said vehicle, said charging system outputs a command for operating said relay, and the step of determining whether or not a malfunction exists includes a step of determining that a malfunction exists in said EVSE at any of the path for supplying electric power from said power source to said vehicle, said relay, and a path for transferring said command, if said pilot signal is being output and the voltage detected is smaller than a threshold value.

11. The malfunction determining method for a charging system according to claim 7, wherein:

said EVSE is provided with a relay that opens/closes a path for supplying electric power from said power source to said vehicle, said charging system outputs a command for operating said relay, and the step of determining whether or not a malfunction exists includes a step of determining that a malfunction exists in said EVSE at any of the path for supplying electric power from said power source to said vehicle, said relay, and a path for transferring said command, if said pilot signal is being output and the voltage detected is zero.

12. The malfunction determining method for a charging system according to claim 7, wherein said vehicle has a charger mounted thereon to control electric power charged to said battery.

13. A malfunction determining apparatus for a charging system that charges a battery mounted on a vehicle by electric power supplied from a power source external to said vehicle to said battery via an Electric Vehicle Supply Equipment (EVSE) when said vehicle and said power source are coupled to each other by said EVSE, wherein said EVSE outputs a pilot signal, which indicates a capacity of current able to be supplied, when connected to said vehicle and said power source, the malfunction determining apparatus comprising:

a voltage sensor that detects a voltage of said power source within said vehicle; and determining means for determining whether or not a malfunction exists, in accordance with an output state of said pilot signal and the voltage detected, wherein said determining means includes means for determining that a malfunction exists in said EVSE if said pilot signal is not being output and the voltage detected is larger than a threshold value.

14. The malfunction determining apparatus for a charging system according to claim 13, wherein said determining means includes means for determining whether or not a malfunction exists in accordance with the output state of said pilot signal and the voltage detected, when a predetermined condition is satisfied.

15. The malfunction determining apparatus for a charging system according to claim 14, wherein said condition is at least one of a condition in which supply of electric power between said battery and said voltage sensor is stopped, a condition in which said EVSE is connected to the vehicle, and a condition in which a charge on a capacitor provided between said battery and said voltage sensor is zero.

16. The malfunction determining apparatus for a charging system according to claim 13, wherein:

said EVSE is provided with a relay that opens/closes a path for supplying electric power from said power source to said vehicle, said charging system outputs a command for operating said relay, and said determining means includes means for determining that a malfunction exists in said EVSE at any of the path for supplying electric power from said power source to said vehicle, said relay, and a path for transferring said command, if said pilot signal is being output and the voltage detected is smaller than a threshold value.

17. The malfunction determining apparatus for a charging system according to claim 13, wherein:

said EVSE is provided with a relay that opens/closes a path for supplying electric power from said power source to said vehicle, said charging system outputs a command for operating said relay, and said determining means includes means for determining that a malfunction exists in said EVSE at any of the path for supplying electric power from said power source to said vehicle, said relay, and a path for transferring said command, if said pilot signal is being output and the voltage detected is zero.

18. The malfunction determining apparatus for a charging system according to claim 13, wherein said vehicle has a charger mounted thereon to control electric power charged to said battery.

19. A malfunction determining apparatus for a charging system that charges a power storage device mounted on a vehicle by electric power supplied from a power source external to said vehicle to said power storage device via a coupling instrument when said vehicle and said power source are coupled to each other by said coupling instrument, wherein said coupling instrument outputs a signal, which indicates a capacity of current able to be supplied, when connected to said vehicle and said power source, the malfunction determining apparatus comprising:

a voltage sensor that detects a voltage of said power source within said vehicle; and a control unit, wherein said control unit determines that a malfunction exists in said coupling instrument if said signal is not being output and the voltage detected is larger than a threshold value.

20. A malfunction determining method for a charging system that charges a power storage device mounted on a vehicle by electric power supplied from a power source external to said vehicle to said power storage device via a coupling instrument when said vehicle and said power source are coupled to each other by said coupling instrument, wherein said coupling instrument outputs a signal, which indicates a capacity of current able to be supplied, when connected to said vehicle and said power source, the malfunction determining method comprising the steps of:
- detecting a voltage of said power source using a voltage sensor provided within said vehicle; and
- determining exists in said coupling instrument if said signal is not being output and the voltage detected is larger than a threshold value.

21. A malfunction determining apparatus for a charging system that charges a power storage device mounted on a vehicle by electric power supplied from a power source external to said vehicle to said power storage device via a coupling instrument when said vehicle and said power source are coupled to each other by said coupling instrument, wherein said coupling instrument outputs a signal, which indicates a capacity of current able to be supplied, when connected to said vehicle and said power source, the malfunction determining apparatus comprising:
- a voltage sensor that detects a voltage of said power source within said vehicle; and
- means for determining that a malfunction exists in said coupling instrument if said signal is not being output and the voltage detected is larger than a threshold value.

* * * * *